United States Patent
Heitner

[15] 3,694,013
[45] Sept. 26, 1972

[54] SCREW CONNECTIONS FOR STRUCTURES SUCH AS ROOF SKYLIGHTS

[72] Inventor: Alfred Heitner, Buttgen, Germany
[73] Assignee: Klaus Esser KG, Norf, Germany
[22] Filed: Jan. 22, 1971
[21] Appl. No.: 108,737

[30] Foreign Application Priority Data

Jan. 23, 1970 Germany .........G 70 02 316.4

[52] U.S. Cl. ..........287/189.36 F, 151/41.76, 151/69
[51] Int. Cl. ................................................F16b 5/02
[58] Field of Search ......151/41.76, 41.7, 69; 52/200; 85/32 K; 287/189.36 F

[56] References Cited

UNITED STATES PATENTS

| | | | |
|---|---|---|---|
| 2,672,659 | 3/1954 | Becker | 151/41.7 |
| 2,633,175 | 3/1953 | Desbrueres | 151/41.76 |
| 1,646,366 | 10/1927 | Carr | 151/41.76 |
| 2,610,593 | 9/1952 | Wasserman | 52/200 |

FOREIGN PATENTS OR APPLICATIONS 459,349 1/1937 Great Britain..........151/41.76

Primary Examiner—Edward C. Allen
Attorney—Oberlin, Maky, Donnelly & Renner

[57] ABSTRACT

A screw connection for a roof skylight comprises a screw which passes through a shell forming a light dome and through a shell mounting frame. Carried in the frame is a nut with a head on the side of the frame remote from the dome, the head preventing the nut from rotating in the frame as the screw is turned by co-operating with a portion of the frame. A locking plate is fitted onto the nut on the side of the frame remote from the nut head, to hold the nut in position in the frame while the nut and screw are not interengaged.

1 Claim, 3 Drawing Figures

PATENTED SEP 26 1972
3,694,013
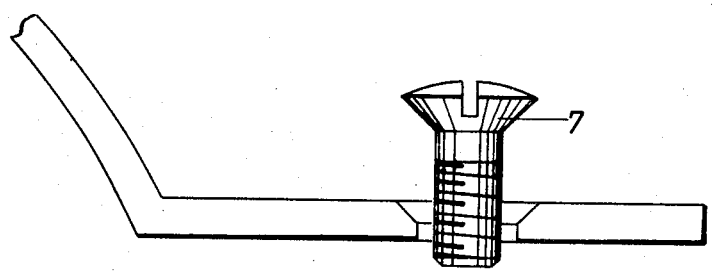
FIG. 1
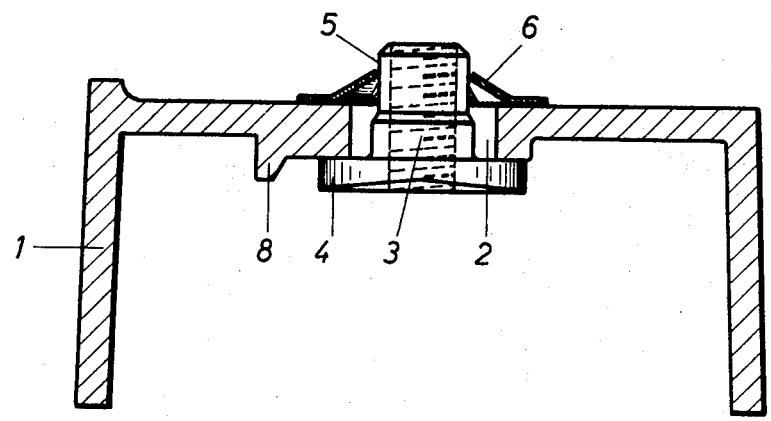
FIG. 2  FIG. 3
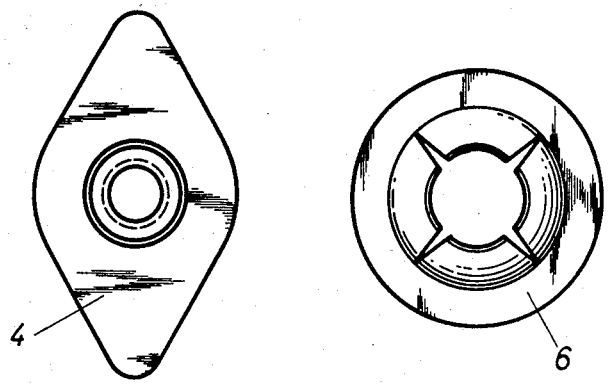

SCREW CONNECTIONS FOR STRUCTURES SUCH AS ROOF SKYLIGHTS

BACKGROUND OF THE INVENTION

A roof skylight such as for example a light dome has been proposed, which comprises a shell or shells mounted on a support means such as a rim or frame structure. The shell or shells are secured by means of screw connections, with a screw which passes through the shell or shells, and which engages into a nut seated in the frame structure. Usually the flat or curved roof skylight rests on the frame or a mounting rim which is made of one of the materials normally used for that purpose. In one screw connection for securing roof skylights, in this case light domes, on a frame, the connecting members include an elongated threaded screw which must be inserted upwardly into a hole in the frame, the threaded screw also passing through the edge of the light dome. The light dome is secured by fitting a screw cap and turning a collar nut with screw head, which is carried by the former, downwardly on to the threaded screw (Essmann Bauhandbuch, 1968, Second Edition 96, 97). This type of connection suffers from the disadvantage however that the screw which is fitted loosely into the frame must be inserted upwardly and must also be held from below when turning the collar nut. To secure the light dome at its hinge side, it is necessary to open the frame completely, to gain access to the underside of the frame, so that where a ventilator is also fitted, it is necessary to release the ventilator frame from the installation means, which is very complicated and time-consuming, particularly in the case of large-sized frames.

In another known method of securing a light dome (German Gebrauchsmuster No. 1,963,591), a thread is cut into the mounting frame so that the parts can be screwed together from above. A disadvantage with this arrangement is that the rigid screw connection formed thereby does not allow sufficiently for compensating for variations in the dimensions of the parts and movement between the interconnected parts as a result of varying rates of heat expansion.

A light dome securing means is also known (German Patent No. 1,290,325) in which the screw connection includes a threaded sleeve pressed into the frame. Here too there is not sufficient lateral clearance between the interconnected parts to allow for dimensional variations and heat expansion.

SUMMARY OF THE INVENTION

An object of the invention is to provide a roof skylight which overcomes the above disadvantages.

A further object of the invention is to provide a roof skylight in which screwing can be effected from above, and wherein there is sufficient lateral clearance between the parts which are screwed together to compensate for variations in the dimensions of the parts and to permit movement thereof which is due to different rates of heat expansion.

According to the present invention, there is provided a roof skylight such as a light dome comprising at least one shell, frame means to support the shell, and a screw connection comprising a nut member carried by the frame means, a screw which passes through the shell and which engages into the nut member, and a nut member locking plate, the nut member having on the side of the support means which is remote from the screw, a head portion capable of preventing substantial rotation of the nut member relative to the support means and the nut member being held in the support means with radial clearance by the locking plate which prevents axial movement of the nut member.

In an advantageous embodiment, the nut member is prevented from rotating by the head portion of the nut member having at least one projection which lies against an abutment means on the support means to prevent rotation of the nut member.

To provide radial clearance on all sides, the nut member can have a cylindrical sleeve portion which carries the internal nut thread, and which is located in a bore of larger diameter in the support means.

The nut may be prevented from falling out of the frame means in a very simple but effective manner by a locking plate which has a substantially radially split frustoconical portion which, after the plate has been fitted on to the sleeve portion of the nut member, engages non-releasably therearound.

In a further aspect of the invention, a screw connection comprises nut means carried in use by the first member; screw means extending in use through the second member with radial clearance and engaging into the nut means; and a locking plate which can be fitted on to the nut member so that the nut member is substantially immovable axially, the nut member having a head portion capable of co-operating with said first member on the side thereof remote from said second member such that said nut member is also substantially non-rotatable relative to said first member.

BRIEF DESCRIPTION OF THE DRAWING

An embodiment of a screw connection according to the present invention will now be described by way of example with reference to the accompanying drawing, in which:

FIG. 1 is an exploded view of a shell of a light dome and the mounting frame, with the mounting frame being shown in cross-section with a nut fitted into the bore thereof, FIG. 2 shows a plan view of the head of the nut, FIG. 3 shows a plan view of a locking plate.

DESCRIPTION OF THE PREFERRED EMBODIMENT

FIG. 1 shows a cross-section through a U-shaped mounting frame 1 which is provided with a bore 2. A transparent or translucent shell or shells which form for example a light dome will be mounted on the mounting frame 1, to constitute a structure such as a roof skylight. Inserted upwardly into the bore 2 is a nut member 3 which comprises an enlarged nut head 4 and a cylindrical sleeve portion which carries an internal thread. The nut member 3 is prevented from dropping out of the bore 2 by a locking plate 6 which is pressed downwardly on to a close-tolerance part 5 of the cylindrical sleeve portion. As is clearly visible in FIG. 1, the locking plate 6 has a substantially flat annular portion around a central frustoconical portion in which there is a hole to receive the part 5. The frustoconical portion has radial slots (FIG. 3) which divide that portion into tongue areas. When the locking plate 6 is fitted on to the part 5, the tongues engage barb-like and non-releasably with the part 5. This locking plate 6 therefore prevents axial displacement of the nut member 3 but permits a radial clearance within the bore 2.

A screw 7 can be inserted downwardly into the nut member 3, the screw 7 passing through for example the thinly drawn shell of a light dome, conventional spacer members and sealing means also being utilized. When the screw 7 is turned to tighten the connection, the nut member 3 is entrained thereby until a projection on the nut head 4 comes to lie against an abutment 8 on the frame 1, to prevent further rotation of the nut member 3.

FIG. 2 shows by way of example a nut head 4 of rhomboid shape. This head configuration thus provides two oppositely located ears or projections. The same aim is achieved however by the nut head having a single projection, or by a pin inserted radially through the cylindrical sleeve portion, in which case the nut head can be omitted.

The plan view in FIG. 3 of the locking plate 6 clearly shows the slotted construction of its frustoconical portion which, after being fitted onto the sleeve portion of the nut member 3, engages non-releasably therearound.

Obviously the securing means described herein is suitable not only for the screw connection of roof skylights but can with advantage be used wherever a similar purpose is to be achieved.

I claim:

1. In a roof skylight including a shell and frame means to support the shell, means for securing the shell to the frame means, the securing means comprising a nut member carried by the frame means, a screw which passes through an aperture in the shell and engages into the nut member, and a nut member locking plate, the nut member comprising on the side of the frame means which is remote from the screw a head portion having at least one projection which can bear against a stop on the frame means for preventing rotation of the nut member, and a sleeve portion which extends with radial play on all sides through an aperture in the frame means and projects out of the frame means towards the screw and is tapered at its end towards the screw, said aperture having a diameter larger than the diameter of the projecting portion of said sleeve, and the nut member locking plate having a slotted frustoconical portion which non-releasably engages around the sleeve portion to prevent axial displacement of the nut member in the frame means.

* * * * *